United States Patent
Sanzgiri et al.

(10) Patent No.: US 11,616,795 B2
(45) Date of Patent: Mar. 28, 2023

(54) METHODS AND APPARATUS FOR DETECTING ANOMALOUS ACTIVITY OF AN IOT DEVICE

(71) Applicant: McAfee, LLC, Santa Clara, CA (US)

(72) Inventors: Ameya Sanzgiri, Fremont, CA (US); Yi Zheng, Los Gatos, CA (US)

(73) Assignee: McAfee, LLC, San Jose, CA (US)

( * ) Notice: Subject to any disclaimer, the term of this patent is extended or adjusted under 35 U.S.C. 154(b) by 470 days.

(21) Appl. No.: 16/549,806

(22) Filed: Aug. 23, 2019

(65) Prior Publication Data

US 2021/0058415 A1  Feb. 25, 2021

(51) Int. Cl.
*H04L 9/40* (2022.01)
*G06N 20/00* (2019.01)
*G06K 9/62* (2022.01)

(52) U.S. Cl.
CPC ........ *H04L 63/1425* (2013.01); *G06K 9/6256* (2013.01); *G06N 20/00* (2019.01); *H04L 63/145* (2013.01); *H04L 63/1416* (2013.01); *H04L 63/1433* (2013.01)

(58) Field of Classification Search
CPC ............. H04L 63/1425; H04L 63/1416; H04L 63/1433; H04L 63/145; G06N 20/00; G06N 3/08; G06N 3/0454; G06N 20/10; G06K 9/6256; G06K 9/628
USPC .......................................................... 726/25
See application file for complete search history.

(56) References Cited

U.S. PATENT DOCUMENTS

| | | | | |
|---|---|---|---|---|
| 9,225,732 | B2* | 12/2015 | Beyah | H04L 63/1408 |
| 9,330,257 | B2* | 5/2016 | Valencia | G06F 21/316 |
| 2013/0291111 | A1* | 10/2013 | Zhou | G06F 21/566 |
| | | | | 726/23 |
| 2014/0123289 | A1* | 5/2014 | Hsiao | G06F 21/566 |
| | | | | 726/23 |
| 2016/0103996 | A1* | 4/2016 | Salajegheh | G06F 21/316 |
| | | | | 726/25 |
| 2017/0024660 | A1* | 1/2017 | Chen | G06F 21/552 |
| 2018/0124080 | A1* | 5/2018 | Christodorescu | G06F 21/552 |
| 2018/0198812 | A1* | 7/2018 | Christodorescu | H04L 63/1425 |
| 2019/0042745 | A1* | 2/2019 | Chen | G06F 21/566 |

(Continued)

OTHER PUBLICATIONS

Du et al., "Deeplog: Anomaly detection and diagnosis from system logs through deep learning," In Proceedings of the 2017 ACM SIGSAC Conference on Computer and Communications Security (2017), CCS '17, ACM, pp. 1285-1298, 14 pages.

(Continued)

*Primary Examiner* — Badri Narayanan Champakesan
(74) *Attorney, Agent, or Firm* — Hanley, Flight & Zimmerman, LLC

(57) ABSTRACT

Methods, apparatus, systems, and articles of manufacture for detecting anomalous activity of an IoT device are disclosed. An example apparatus includes a communications aggregator to aggregate communications from a device communicating via a communications interface, a statistical property extractor to extract statistical properties of the aggregated communications, an image generator to generate an image based on the extracted statistical properties, a persona identifier to identify a persona associated with the device, and a machine learning model trainer to train a machine learning model using the generated image and the persona.

20 Claims, 6 Drawing Sheets

(56) References Cited

U.S. PATENT DOCUMENTS

| | | | | |
|---|---|---|---|---|
| 2019/0065738 | A1* | 2/2019 | Kim | G06F 21/552 |
| 2019/0130101 | A1* | 5/2019 | Chen | G06F 21/554 |
| 2019/0311186 | A1* | 10/2019 | Chen | G06V 10/764 |
| 2020/0042370 | A1* | 2/2020 | Kao | G06K 9/6276 |
| 2020/0044962 | A1* | 2/2020 | Sanzgiri | H04L 45/306 |
| 2020/0285737 | A1* | 9/2020 | Kraus | G06F 21/552 |
| 2020/0342252 | A1* | 10/2020 | Givental | G06V 10/764 |
| 2021/0194909 | A1* | 6/2021 | Tang | H04L 63/1416 |

OTHER PUBLICATIONS

Nanduri et al., "Anomaly detection in aircraft data using recurrent neural networks (RNN)," In Integrated Communications Navigation and Surveillance (ICNS), 2016 (2016), IEEE, 9 pages.

Kruegel et al., "Anomaly detection of web-based attacks," In Proceedings of the 10th ACM conference on Computer and communications security (2003), ACM, pp. 251-261, 11 pages.

Malhotra et al., "Long short term memory networks for anomaly detection in time series," In Proceedings European Symposium on Artifical Neural Networks Computational Intelligence and Machine Learning (Apr. 2015), Presses universitaires de Louvain, pp. 89-94, 6 pages.

Jia et al., "ContexIoT: Towards providing contextual integrity to appified IoT platforms," In 24th Annual Network & Distributed System Security Symposium (NDSS) (Feb. 2017), 15 pages.

Oprea et al., "Detection of early-stage enterprise infection by mining large-scale log data," In Dependable Systems and Networks (DSN), 2015 45th Annual IEEE/IFIP International Conference on (2015), IEEE, pp. 45-56, 16 pages.

Sekar et al., Specification-based anomaly detection: a new approach for detecting network intrusions. In Proceedings of the 9th ACM conference on Computer and communications security (2002), ACM, pp. 265-274, 10 pages.

Rajasegarar et al., "Hyperspherical cluster based distribution anomaly detection in wireless sensor networks," Journal of Parallel and Distributed Computing, vol. 74, Issue 1, pp. 1833-1847, Jan. 2014, 3 pages, (Abstract only).

Raza et al., "Svelte: Real-time intrusion detection in the Internet of Things," Ad Hoc Networks, vol. 11, Issue 8, pp. 2661-2674, Nov. 2013, 3 pages, (Abstract Only).

\* cited by examiner

METHODS AND APPARATUS FOR DETECTING ANOMALOUS ACTIVITY OF AN IOT DEVICE

FIELD OF THE DISCLOSURE

This disclosure relates generally to anomaly detection, and, more particularly, to methods and apparatus for detecting anomalous activity of an Internet of Things (IoT) device.

BACKGROUND

Today's technology allows for many devices to communicate with a larger network (e.g., the Internet). Internet of Things (IoT) technology enables consumer devices such as sensors, displays, thermostats, home security systems, home automation systems, etc. to communicate via the Internet. Despite their limited resources and/or limited intended functionality (e.g., functionality particular to performing home automation activities, temperature control, etc.), IoT devices are still vulnerable to malware, tampering, and other security issues.

BRIEF DESCRIPTION OF THE DRAWINGS

The figures are not to scale. In general, the same reference numbers will be used throughout the drawing(s) and accompanying written description to refer to the same or like parts.

Figure 1:
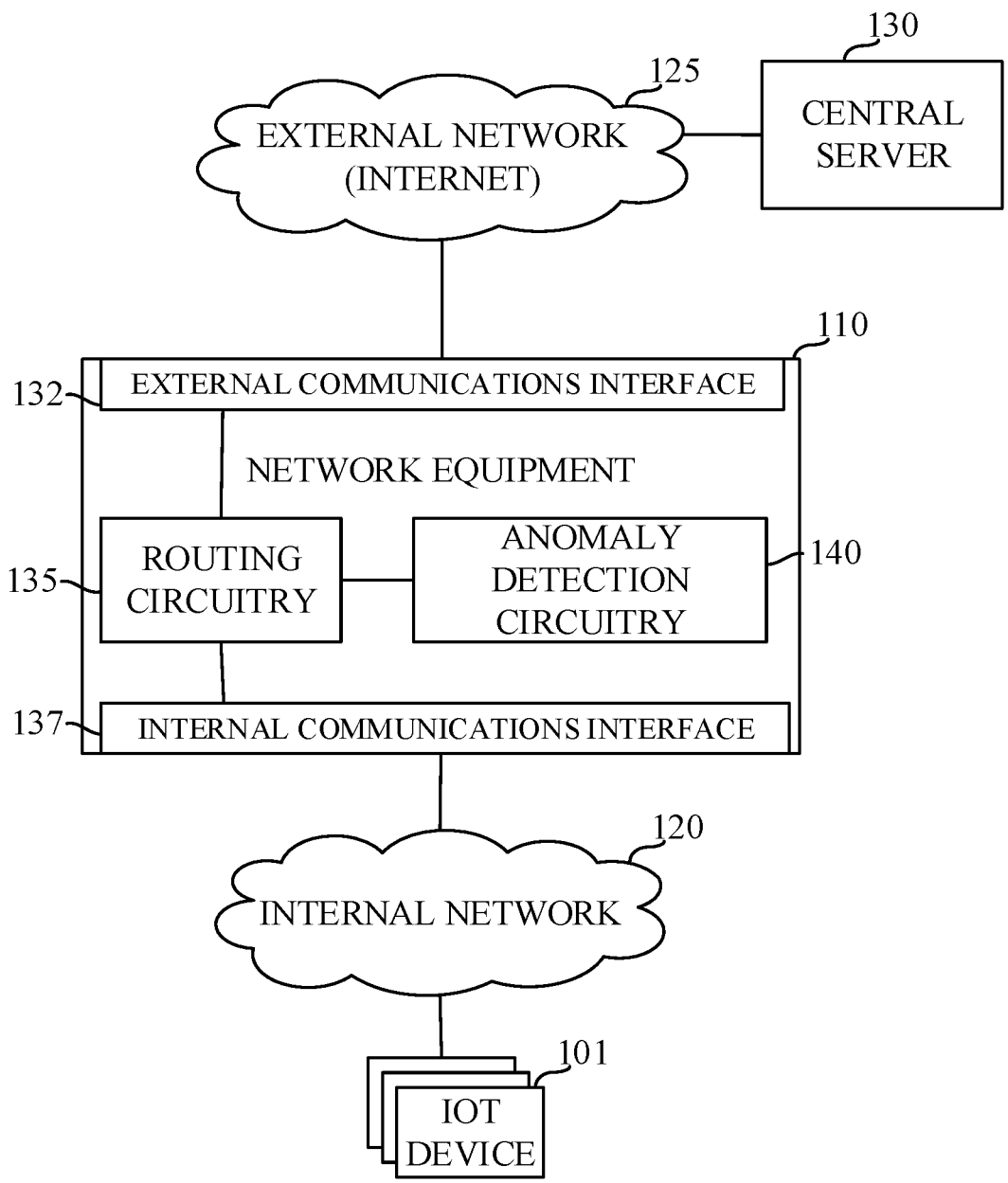
FIG. 1 is a block diagram of an example environment of use in which anomaly detection circuitry constructed in accordance with teachings of this disclosure detects anomalous activity of an IoT device.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Machine learning (ML) and/or artificial intelligence (AI) enables machines (e.g., computers, logic circuits, etc.) to generate an output based on a given input. AI enables a machine to use a model to process the input and generate the output. ML enables the model to be trained such that particular input(s) result in particular output(s).

Anomaly detection systems are a subset of AI/ML technologies, which strive to identify when a particular set of input data does not match a normal/baseline situation. Anomaly detection has become an integral part of security services offered by entities that provide security services. A core principle of anomaly detection is the ability to inform a user of any deviation from the normal/baseline, but does not necessarily infer whether such deviation is malicious or not.

Traditionally, Anomaly Detection (AD), in the context of a security framework, depends on indicators that are useful to a user. Some existing AD techniques range from simple statistical modeling and count(s) to more advanced cognitive learning solutions. Unfortunately, existing techniques operate on features that are specific to particular devices, which translates to considerable development effort for configuring and/or deploying such systems. From a practical standpoint, this also means that such existing systems are not readily scalable. Moreover, such techniques are not designed for use in connection with IoT devices. Consumer devices, unlike traditional devices which are controlled by access control lists (ACLs) and operate in a more controlled environment, operate under many different network conditions that add variances and deviations (due to the use of non-dedicated Load Balancers to disparate amount of Endpoint URLs, Encrypted Traffic, etc.) that can delay baselining process. Further, a single IoT device may have multiple capabilities.

Devices communicating on a network might communicate via a number of different network interfaces and/or technologies such as Zigbee, Bluetooth, WiFi, etc. Example approaches disclosed herein evaluate statistical properties of the network interfaces and communications over such network interfaces, and aggregate the statistical properties into a persona that is specific to a device's communications, without having to understand the device characteristics. As used herein, a persona is an aggregation of statistical properties of communications of a device. Such persona information is classified using machine learning approaches to classify the activity of the device as anomalous or not anomalous. This approach is not user usage dependent, so high entropy and/or divergent data is still considered. Moreover, this approach is semi-supervised and is, therefore, scalable to modern consumer scale without the need for supervised approaches.

In general, implementing an ML/AI system involves two phases, a learning/training phase and an inference phase. In the learning/training phase, a training algorithm is used to train a model to create a particular output given a particular input based on, for example, training data. In general, the model includes internal parameters that guide how input data is transformed into output data. Additionally, hyperparameters are used as part of the training process to control how the learning is performed (e.g., a learning rate, a number of layers to be used in the machine learning model, etc.). Once trained, other data (e.g., live data) is input to the model in the inference phase to create an output. This inference phase is when the AI is "thinking" to generate the output based on what it learned from the training (e.g., from the model). In some examples, input data undergoes pre-processing before being used as an input to the machine learning model. Moreover, in some examples, the output data may undergo post-processing after it is generated by the AI model to transform the output into a useful result (e.g., an instruction to be executed by the machine).

Many different types of machine learning models and/or machine learning architectures exist. In examples disclosed herein, a convolutional neural network (CNN) model is used. Using a CNN model enables classification of communications of a device as a particular persona. In general, machine learning models/architectures that are suitable to use in the example approaches disclosed herein will be models/architectures that can be trained to classify input information into one or more output classifications. However, other types of machine learning models could additionally or alternatively be used such as, for example, a deep neural network (DNN), a support vector machine (SVM), etc.

As noted above, ML/AI models are trained to produce a particular output given a particular input. Different types of training may be performed, based on the type of ML/AI model and/or the expected output. For example, supervised training uses inputs and corresponding expected outputs to iterate over combinations of select parameters the ML/AI model that reduce an amount of error.

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed at anomaly detection circuitry present at network equipment where the model is ultimately to be executed. However, in some examples, such training may be performed at a centralized location (e.g., a cloud server), and such models may be provided to the network equipment for later use. In some examples, training may be performed in a mixed manner, where an initial model is provided to the network equipment from the centralized location, and further training is performed at the network equipment. Training is performed using hyperparameters that control how the learning is performed (e.g., a learning rate, a number of layers to be used in the machine learning model, etc.). In some examples, re-training may be performed. Such re-training may be performed in response to an amount of time elapsing since prior training, in response to a misidentification of an anomaly, etc.

Training is performed using training data. In examples disclosed herein, the training data originates from communications and associated profiles collected and/or identified during a baselining period. Because supervised training is used, the training data is labeled. Labeling is applied to the training data by generating a persona label for different communications that are included in the training data. In some examples, the training data is pre-processed to, for example, create an image based on statistical properties of the communications.

Once training is complete, the model is stored at the network equipment that is to execute the model. The model may then be executed by an anomaly detection circuit of the network equipment in connection with routing circuitry to enable detection of anomalous communications.

FIG. 1 is a block diagram of an example environment of use 100 including a system constructed in accordance with teachings of this disclosure for detecting anomalous activity of an IoT device 101. The example system includes network equipment 110 that enables the IoT device 101 to communicate with external data sources via an internal network 120 and an external network 125. The example system includes a central server 130. The example network equipment 110 includes an external communications interface 132, routing circuitry 135, an internal communications interface 137, and anomaly detection circuitry 140.

The example IoT device 101 of the illustrated example of FIG. 1 is implemented by a computing device that communicates with other network data connected devices and/or servers (e.g., via the Internet). IoT devices include, for example, Internet-enabled thermostats, Internet-enabled refrigerators, Internet-enabled microwaves, home automation systems, home security system sensors, etc. In some examples, IoT devices are intended to have limited resources and/or limited intended functionality. Despite the limited resources and/or limited intended functionality, IoT devices are still vulnerable to malware, tampering, and other security issues. In examples disclosed herein, multiple IoT devices may be used and/or be present, and may present similar and/or different functionalities (e.g., a first IoT device may be a portion of a home lighting automation system, while a second IoT device may be a thermostat).

The example external communications interface 132 of the illustrated example of FIG. 1 enables the network device to communicate via the external network 125. The external communications interface 132 is implemented by a communication device such as a transmitter, a receiver, a transceiver, a modem and/or network interface card to facilitate exchange of data with external machines (e.g., computing devices of any kind) via a network interface (e.g., an Ethernet connection, a digital subscriber line (DSL), a telephone line, coaxial cable, a cellular telephone system, etc.). The example external network 125 of the illustrated example of FIG. 1 represents the Internet. However, any other external network such as, for example, a Wide Area Network (WAN), a metropolitan area network (MAN), a virtual private network (VPN), etc. may additionally or alternatively be used.

The example routing circuitry 135 of the illustrated example of FIG. 1 enables communications received via either the internal communications interface 137 or the external communications interface 132 to be routed to a selected destination. For example, if the IoT device 101 were attempting to communicate with an external server (e.g., a server communicating via the Internet), the example routing circuitry 135 may receive those communications via the internal communications interface 137 and relay the communications to the destination via the external communications interface 132. In some other examples, the IoT device 101 may attempt to communicate with another device (e.g., another IoT device, a desktop computer, an accessory device, etc.) via the internal network 120. In such an example, the routing circuitry 135 may receive the communications via the internal communications interface 137 and relay the communications to the destination via the internal communications interface 137. In examples disclosed herein, the example routing circuitry 135 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), Coarse Grained Reduced precision architecture (CGRA(s)), image signal processor(s) (ISP(s)), etc.

The internal communications interface 137 is implemented by a communication device such as a transmitter, a receiver, a transceiver, a modem and/or network interface card to facilitate exchange of data with external machines (e.g., computing devices of any kind) via a network interface. The example internal communications interface 137 of the illustrated example of FIG. 1 hosts a wireless local area network (LAN) using, for example, WiFi. However, any other past, present, and/or future approach to hosting a LAN and/or other communications network may additionally or alternatively be used such as, for example, a Bluetooth interface, an Ethernet interface, a Zigbee interface, etc. As a result, the example internal network 120 of the illustrated example of FIG. 1 represents one or more network(s) such as, for example, a Bluetooth network, a WiFi network, an Ethernet network, etc. The example internal communications interface 137 provides communications to the example routing circuitry 135 to enable delivery of those communications to a destination as well as the anomaly detection circuitry 140.

The example anomaly detection circuitry 140 of the illustrated example of FIG. 1 analyzes communications routed by the routing circuitry 135 to detect anomalous communications. An example implementation of the anomaly detection circuitry 140 is described below in connection with FIG. 2.

The example central server 130 of the illustrated example of FIG. 1 is a server that communicates via a network such as, for example, the external network 125 (e.g., the Internet), to provide instructions that may be executed at the network equipment 110. That is, the example central server 130 provides instructions (e.g., executable instructions) to the network equipment 110 to enable the detection of anomalous communications. In some examples, the instructions provided to the network equipment 110 are executable instructions that may be directly executed at the network equipment 110. However, in some examples, the instructions are provided as part of a software development kit (SDK), application programming interface (API) to an intermediary party (e.g., a manufacturer, an app developer) to enable the intermediary party to create (e.g., design, develop, compile, etc.) executable instructions (e.g., an application, firmware, etc.) to be executed at the network equipment 110. In some examples, the central server 130 provides additional information such as, for example, a model to the anomaly detection circuitry 140 to facilitate the detection of anomalous communications.

Figure 2:
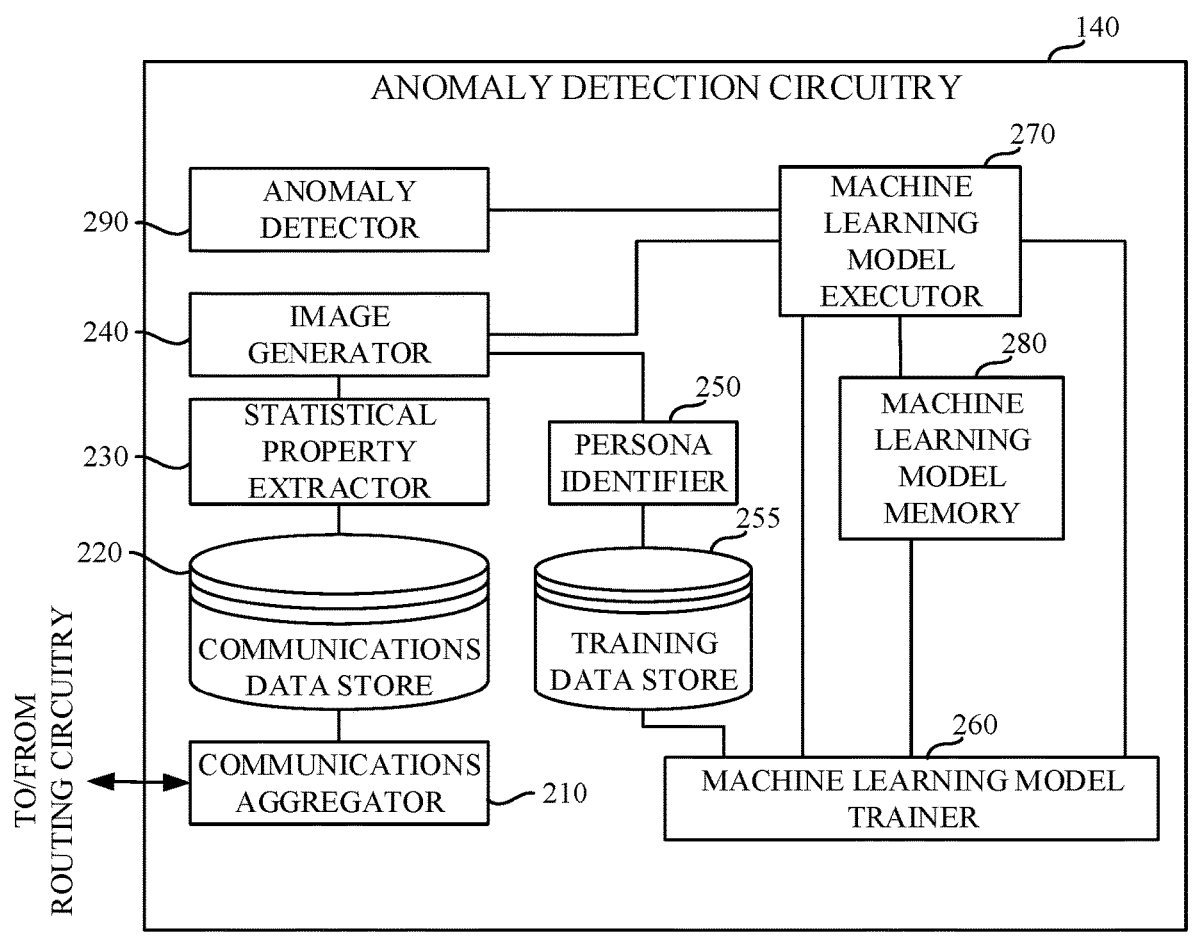
FIG. 2 is a block diagram representing an example implementation of the anomaly detection circuitry of FIG. 1.

FIG. 2 is a block diagram representing an example implementation of the anomaly detection circuitry 140 of FIG. 1. The example anomaly detection circuitry 140 of the illustrated example of FIG. 2 includes a communications aggregator 210, a communications data store 220, a statistical property extractor 230, an image generator 240, a persona identifier 250, a training data store 255, a machine learning model trainer 260, a machine learning model executor 270, a machine learning model memory 280, and an anomaly detector 290.

The example communications aggregator 210 of the illustrated example of FIG. 2 stores device communications accessed via the routing circuitry 135 in the communications data store 220. In examples disclosed herein, the device communications reflect communications of IoT devices communicating via the internal communications interface(s) 127 over any one or more different communication networks. For example, the example communications aggregator 210 may store both WiFi communications and Bluetooth communications accessed via the routing circuitry 135. In some examples, when storing the communications in the example communications data store 220, the example communications aggregator 210 additionally stores a timestamp of the communication to allow later time-based analysis of when particular communications were accessed.

The example communications aggregator 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example communications aggregator 210 may implement means for aggregating.

The example communications data store 220 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example communications data store 220 may be in any data format such as, for example, binary data, comma delimited data, tab delimited data, structured query language (SQL) structures, etc. While, in the illustrated example, the communications data store 220 is illustrated as a single device, the example communications data store 220 and/or any other data storage devices described herein may be implemented by any number and/or type(s) of memories. In the illustrated example of FIG. 2, the example communications data store 220 stores communications accessed by the communications aggregator 210. The stored communications may later be accessed by the example statistical property extractor 230 to perform a statistical analysis of the communications associated with a particular device.

The example statistical property extractor 230 of the illustrated example of FIG. 2, using the data stored in the example communications data store 220, identifies a device and extracts statistical information from the communications associated with the identified device. In examples disclosed herein, the statistical information includes, for example, an amount of communications aggregated in connection with the device within a recent time period (e.g., within the last ten minutes, within the last hour, etc.), types of communications aggregated from the device, the presence of a particular parameter and/or content within the communications aggregated from the device (e.g., whether the device attempted to transmit a request to a particular domain name, etc.), etc. In examples disclosed herein, the statistical properties and/or instructions associated with extraction of those statistical properties may be provided to the anomaly detection circuitry 140 from the centralized server 130 periodically and/or a-periodically.

The example statistical property extractor 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example statistical property extractor 230 may implement means for extracting.

The example image generator 240 of the illustrated example of FIG. 2 the example image generator 240 creates an image. In examples disclosed herein, the image represents a data structure capable of storing the extracted statistics or a transformation thereof. In some examples, the image is represented by a two-dimensional array with cell values (e.g., pixel values) corresponding to particular extracted statistics. For example, a first pixel in the image may correspond to an amount of data transmitted by the identified device, and a second pixel in the image may correspond to whether the device has communicated with a particular Internet domain. An example image is described above in connection with FIG. 3.

The example image generator 240 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example image generator 240 may implement means for generating.

The example persona identifier 250 of the illustrated example of FIG. 2 generates a persona label to be used in association with the image generated by the image generator 240. In examples disclosed herein, the persona label is represented by a sequence of alphanumeric characters. However, any other past, present, and/or future approach to labeling a persona may additionally or alternatively be used. In some examples, serially identified personas are used to identify subsequent images. The example persona identifier 250 stores the generated image and the persona label in the training data store 255.

The example persona identifier 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example persona identifier 250 may implement means for identifying.

The example training data store 255 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example training data store 255 may be in any data format such as, for example, binary data, comma delimited data, tab delimited data, structured query language (SQL) structures, etc. While, in the illustrated example, the training data store 255 is illustrated as a single device, the example training data store 255 and/or any other data storage devices described herein may be implemented by any number and/or type(s) of memories. In the illustrated example of FIG. 2, the example training data store 255 stores training data, such as image and persona pairs that may be used by the machine learning model trainer 260 to train a machine learning model stored in the example machine learning model memory 280.

The example machine learning model trainer 260 of the illustrated example of FIG. 2 causes the example machine learning model executor 270 to process the training data stored in the training data store (e.g., images as inputs and expected personas as corresponding outputs) and/or a portion thereof using a machine learning model stored in the machine learning model memory 280. The example machine learning model trainer 260 reviews the output of the machine learning model executor 270 to determine an amount of error of the machine learning model. For example, the model trainer 260 reviews the outputs of the machine learning model to determine whether the outputs from the model, when processing the images stored in the training data store, match the expected personas outputs included in the dataset. Using the calculated amount of error, the example machine learning model trainer 260 updates the model stored in the example machine learning model memory 280 to attempt to increase the accuracy of the model. In some examples, the training process is iterated until an acceptable amount of error is achieved (e.g., an amount of error less than or equal to an error threshold).

The example machine learning model trainer 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example machine learning model trainer 260 may implement means for training.

The example machine learning model executor 270 of the illustrated example of FIG. 2, using the model stored in the machine learning model memory 280, generates a classification for an input image. In examples disclosed herein, as the model stored in the example machine learning model memory 280 is multi-class classification model, and a score is generated corresponding to each device persona identified during the training process. As a result, each generated score represents a similarity of the image to the given device persona. In examples disclosed herein, larger scores (e.g., a score closer to one) indicate a higher degree of similarity, whereas lower scores (e.g., a score closer to zero) indicate a lesser degree of similarity. In some examples, each of the scores, when summed, total to a score of one. However, any other approach to generate a classification for an image may additionally or alternatively be used. For example, a binary classification system may be used and, for each of the device personas, an individual similarity score may be generated.

The example machine learning model executor 270 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example machine learning model executor 270 may implement means for executing.

The example machine learning model memory 280 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example machine learning model memory 280 may be in any data format such as, for example, binary data, comma delimited data, tab delimited data, structured query language (SQL) structures, etc. While, in the illustrated example, the machine learning model memory 280 is illustrated as a single device, the example machine learning model memory 280 and/or any other data storage devices described herein may be implemented by any number and/or type(s) of memories. In the illustrated example of FIG. 2, the example machine learning model memory 280 stores a machine learning model to be used by the machine learning model executor 270.

The example anomaly detector 290 of the illustrated example of FIG. 2 determines whether a device persona is identified using the scores generated by the machine learning model executor 270. The example anomaly detector 290 determines whether the device persona is identified by determining whether any of the scores (e.g., at least one of the scores) meet or exceed a threshold. In some examples, the threshold is based on the number of device personas that are identifiable by the machine learning model (e.g., corresponding to device personas used during training). For example, a lower threshold may be used when there are many device personas. Conversely, if there are a small number of device personas, a larger threshold may be used.

If the example anomaly detector 290 cannot identify a device persona, an anomaly has been detected. The example anomaly detector 290 performs a responsive action and/or causes performance of the responsive action. In some examples, the responsive action is intended to mitigate any malicious activity that may be associated with the communications of the device. For example, the example anomaly detector 290 may instruct the routing circuitry 135 to no longer allow (e.g., to block) communications of the particular IoT device. In some examples, the anomaly detector 290 sends an alert and/or other message to a user associated with the IoT device to alert the user of the anomalous activity.

The example anomaly detector 290 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), programmable controller(s), GPU(s), DSP(s), CGRA(s), ISP(s), etc. The example anomaly detector 290 may implement a means for detecting.

Figure 3:
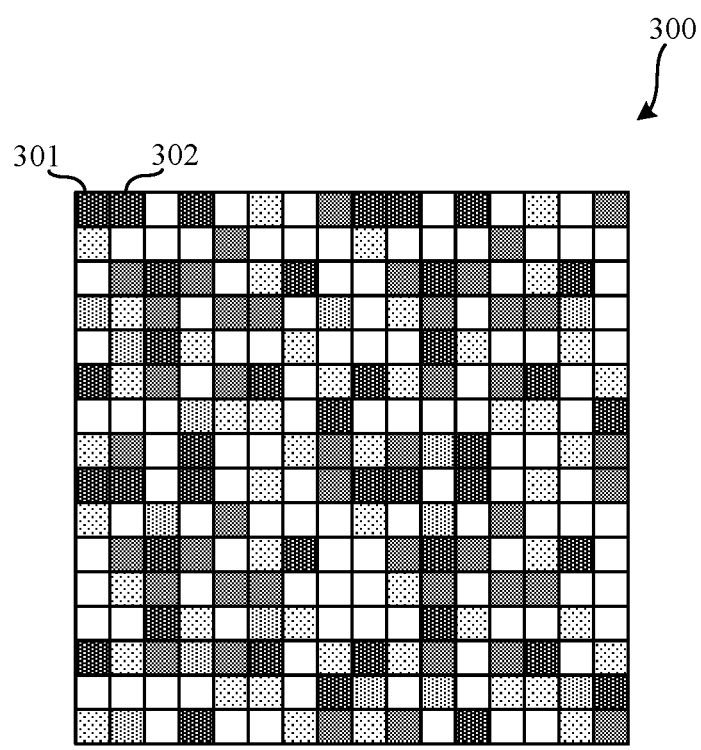
FIG. 3 is a diagram representing an example image created from extracted statistical information.

FIG. 3 is a diagram representing an example image 300 created from extracted statistical information. The image 300 represents a data structure capable of storing the extracted statistics or a transformation thereof. In the illustrated example of FIG. 3, the image is represented by a two dimensional array with cell values (e.g., pixel values) corresponding to particular extracted statistics. For example, a first pixel 301 in the image may correspond to an amount of data transmitted by the identified device, and a second pixel 302 in the image may correspond to whether the device has communicated with a particular Internet domain. In some examples, some of the pixel values are normalized to a numeric value and/or scale. For example, the first pixel 301, when representing an amount of data, may utilize a value between zero and two hundred and fifty-five to represent an amount of data ranging between zero and ten megabytes of data within a threshold amount of time (e.g., the last ten minutes). Conversely, the second pixel, when representing whether the device has communicated with a particular Internet domain, may use a value of zero to represent that the device has not communicated with the particular Internet domain and another value (e.g., one, two hundred and fifty-five) to represent that the device has communicated with the particular Internet domain. In some examples, multiple statistics may be represented by a single pixel.

While an example manner of implementing the example anomaly detection circuitry 140 FIG. 1 is illustrated in FIG. 2, one or more of the elements, processes and/or devices illustrated in FIG. 2 may be combined, divided, re-arranged, omitted, eliminated and/or implemented in any other way. Further, the example communications aggregator 210, the example statistical property extractor 230, the example image generator 240, the example persona identifier 250, the example machine learning model trainer 260, the example machine learning model executor 270, the example anomaly detector 290, and/or, more generally, the example anomaly detection circuitry 140 of FIGS. 1 and/or 2 may be implemented by hardware, software, firmware and/or any combination of hardware, software and/or firmware. Thus, for example, any of the example communications aggregator 210, the example statistical property extractor 230, the example image generator 240, the example persona identifier 250, the example machine learning model trainer 260, the example machine learning model executor 270, the example anomaly detector 290, and/or, more generally, the example anomaly detection circuitry 140 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example communications aggregator 210, the example statistical property extractor 230, the example image generator 240, the example persona identifier 250, the example machine learning model trainer 260, the example machine learning model executor 270, the example anomaly detector 290, and/or, more generally, the example anomaly detection circuitry 140 of FIGS. 1 and/or 2 Z is/are hereby expressly defined to include a non-transitory computer readable storage device or storage disk such as a memory, a digital versatile disk (DVD), a compact disk (CD), a Blu-ray disk, etc. including the software and/or firmware. Further still, the example anomaly detection circuitry 140 of FIGS. 1 and/or 2 may include one or more elements, processes and/or devices in addition to, or instead of, those illustrated in FIG. 2, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
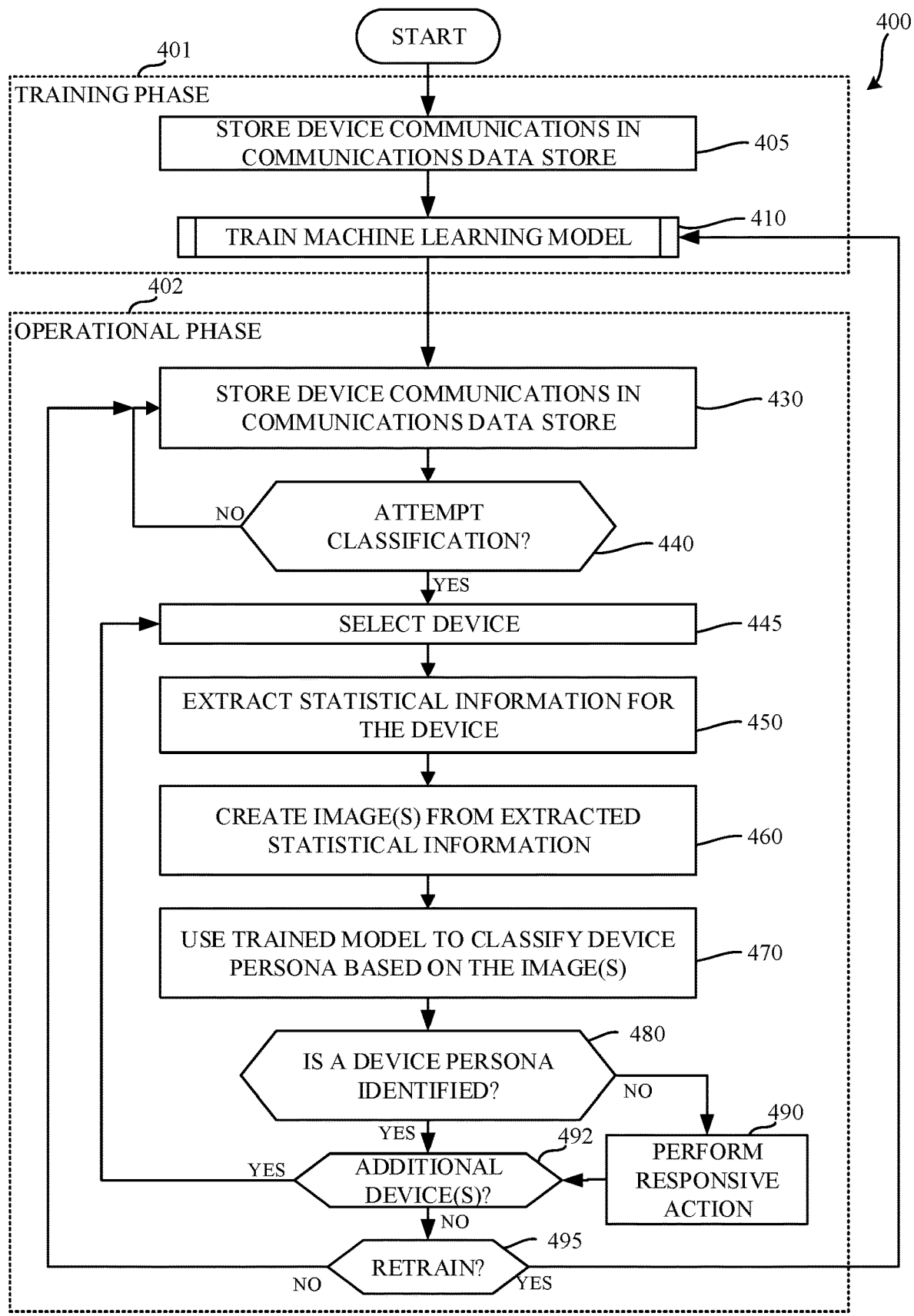
FIG. 4 is a flowchart representative of machine readable instructions which may be executed to implement the example anomaly detection circuitry of FIGS. 1 and/or 2.

Flowcharts representative of example hardware logic, machine readable instructions, hardware implemented state machines, and/or any combination thereof for implementing the example anomaly detection circuitry 140 of FIGS. 1 and/or 2 are shown in FIGS. 4 and/or 5. The machine readable instructions may be one or more executable programs or portion(s) of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and/or 5, many other methods of implementing the example anomaly detection circuitry 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine readable instructions 400 which may be executed to implement the example anomaly detection circuitry 140 of FIGS. 1 and/or 2. The example process 400 of FIG. 4 includes a training phase 401 and an operational phase 402. The example process 400 of FIG. 4 begins when the anomaly detection circuitry 140 is initialized. Such initialization may occur, for example, upon startup of the example network equipment 110 of FIG. 1, at the direction of a user, etc.

The example anomaly detection circuitry 140 enters the training phase 401, where the example communications aggregator 210 stores device communications accessed via the routing circuitry 135 in the communications data store 220. (Block 405). Such aggregated communications represent an initial baseline of communications expected to occur via the internal network 120. In examples disclosed herein, the device communications reflect communications of IoT devices communicating via the internal communications interface(s) 127. Thus, the aggregated communications may include any type of communications such as, for example, Zigbee communications, Bluetooth communications, Ethernet communications, etc. In examples disclosed herein, the communications are aggregated for a threshold period of time (e.g., thirty minutes, one day, etc.). However, any other amount of communications may additionally or alternatively be aggregated. For example, communications may be aggregated until a threshold amount of communications have been aggregated (e.g., one hundred messages, ten megabytes of data, etc.)

Once an appropriate amount (e.g., the threshold amount) of communications have been aggregated, the example anomaly detection circuitry 140 trains a machine learning model. (Block 410). An example process for training the machine learning model is described below in connection with the illustrated example of FIG. 5. In short, a machine learning model is trained to classify an image (which represents statistics extracted from network communications of an IoT device) as corresponding to a particular device persona. As such, based on subsequently collected network communications and an image generated therefrom, the machine learning model can be used to attempt to select a device persona. The selection or, more particularly, the non-selection of the device persona may then be used to indicate whether an anomaly has been detected.

In examples disclosed herein, the model is implemented using a convolutional neural network (CNN). As noted above, using a CNN model enables classification of communications of a device as a particular persona. In general, machine learning models/architectures that are suitable to use in the example approaches disclosed herein will be models/architectures that can be trained to classify input information into one or more output classifications. However, other types of machine learning models could additionally or alternatively be used such as, for example, a deep neural network (DNN), a support vector machine (SVM), etc.

Once training is complete, the example anomaly detection circuitry 140 enters the operational phase 402. The example communications aggregator 210 stores device communications accessed via the routing circuitry 135 in the communications data store 220. (Block 430). In examples disclosed herein, the device communications reflect communications of IoT devices communicating via the internal communications interface(s) 127. As noted above, this communications may include any type of communications such as, for example, Zigbee communications, Bluetooth communications, Ethernet communications, etc.

The example statistical property extractor 230 determines whether a classification is to be attempted. (Block 440). In examples disclosed herein, the determination of whether a classification is to be attempted is based on a threshold amount of communications data being collected for a particular device. However, any other approach to determining whether to attempt to perform classification may additionally or alternatively be used. For example, such a classification may be attempted periodically (e.g., once every minute, once every hour, once every day, etc.), may be triggered (e.g., in response to a user input), etc.

If classification is not to be attempted (e.g., block 440 returns a result of NO), control returns to block 430, where the example communications aggregator 210 continues to store device communications in the communications data store 220. If classification is to be attempted (e.g., block 440 returns a result of YES), the example statistical property extractor 230 identifies a device corresponding to communications stored in the example communications data store 220. (Block 445). The example statistical property extractor 230 extracts statistical information from the communications associated with the identified device. (Block 450). In examples disclosed herein, the statistical information includes, for example, an amount of communications aggregated from the device within a recent time period (e.g., within the last ten minutes, within the last hour, etc.), types of communications aggregated from the device, the presence of a particular parameter and/or content within the communications aggregated from the device (e.g., whether the device attempted to transmit a request to a particular domain name, etc.), etc. In examples disclosed herein, the statistical properties and/or instructions associated with extraction of those statistical properties may be provided to the anomaly detection circuitry from the centralized server 130 periodically and/or a-periodically.

Using the extracted statistics, the example image generator 240 creates an image. (Block 460). In examples disclosed herein, the image represents a data structure capable of storing the extracted statistics or a transformation thereof. In some examples, the image is represented by a two-dimensional array with cell values (e.g., pixel values) corresponding to particular extracted statistics. For example, a first pixel in the image may correspond to an amount of data transmitted by the identified device, and a second pixel in the image may correspond to whether the device has communicated with a particular Internet domain. An example image is described above in connection with FIG. 3.

The example image generator 240 interacts with the machine learning model executor 270 to, using the model stored in the machine learning model memory 280, generate a classification for the image. (Block 470). In examples disclosed herein, as the model stored in the example machine learning model memory 280 is multi-class classification model, and a score is generated corresponding to each device persona identified in the training process. As a result, each score represents a similarity to the given device persona. In examples disclosed herein, larger scores (e.g., a score closer to one) indicate a higher degree of similarity, whereas lower scores (e.g., a score closer to zero) indicate a lesser degree of similarity. In some examples, each of the scores, when summed, total to a score of one. However, any other approach to generate a classification for an image may additionally or alternatively be used. For example, a binary classification system may be used and, for each of the device personas, an individual similarity score may be generated.

The example anomaly detector 290 determines whether a device persona is identified. (Block 480). The example anomaly detector 290 determines whether the device persona is identified by determining whether any of the scores (e.g., at least one of the scores) meet or exceed a threshold. In some examples, the threshold is based on the number of device personas used for training. For example, a lower threshold may be used when there are many device personas. Conversely, if there are a small number of device personas, a larger threshold may be used.

If a device persona (e.g., an output persona) cannot be identified (e.g., block 480 returns a result of NO), an anomaly has been detected. The example anomaly detector 290 performs a responsive action and/or causes performance of the responsive action. (Block 490). In some examples, the responsive action is intended to mitigate any malicious activity that may be associated with the communications of the device. For example, the example anomaly detector 290 may instruct the routing circuitry 135 to no longer allow (e.g., block) communications of the particular IoT device. In some examples, the anomaly detector 290 sends an alert and/or other message to a user associated with the IoT device to alert the user of the anomalous activity.

Upon performance of the responsive action (Block 490) and/or determination that a device persona has been identified (e.g., block 492 returning a result of YES), the example statistical property extractor 230 determines whether there are any other devices having communications stored in the communications data store 220 to be analyzed. (Block 492). If any additional devices having communications stored in the communications data store 220 exist, control proceeds to block 445 where the device is identified and the process of blocks 445 through 490 is repeated for that device.

The example machine learning model trainer 260 determines whether the machine learning model should be re-trained. (Block 495). If re-training is not to occur (e.g., block 495 returns a result of NO), control returns to block 430, where the example communications aggregator 210 continues to store device communications in the communications data store 220. In some examples, additional checks to determine whether to terminate the process 400 of FIG. 4 may additionally be used. For example, the example process 400 of FIG. 4 may be terminated in response to a user request, etc. If re-training is to occur (e.g., block 495 returns a result of YES), control returns to block 410 where re-training occurs.

In the illustrated example of FIG. 4, such retraining is illustrated as being performed in an offline fashion (e.g., training is performed while monitoring is not being performed). In some examples, such re-training may occur in parallel with ongoing monitoring (e.g., in a live fashion). That is, training may occur in an online fashion.

In some examples, the performance of the responsive action involves further analysis to determine whether an anomaly has actually been detected. That is, the detection/identification disclosed above in connection with FIG. 4 may be used as a first level of screening. For example, more resource-intensive analysis of the device communications, statistics of the communications of the device, etc. may additionally be performed. In some examples, the potential anomalous device is isolated on the internal network 120 (e.g., not allowed to communicate via the internal network, allowed only limited communication ability via the internal network 120, etc.) while more extensive monitoring is applied to the communications of the device.

Figure 5:
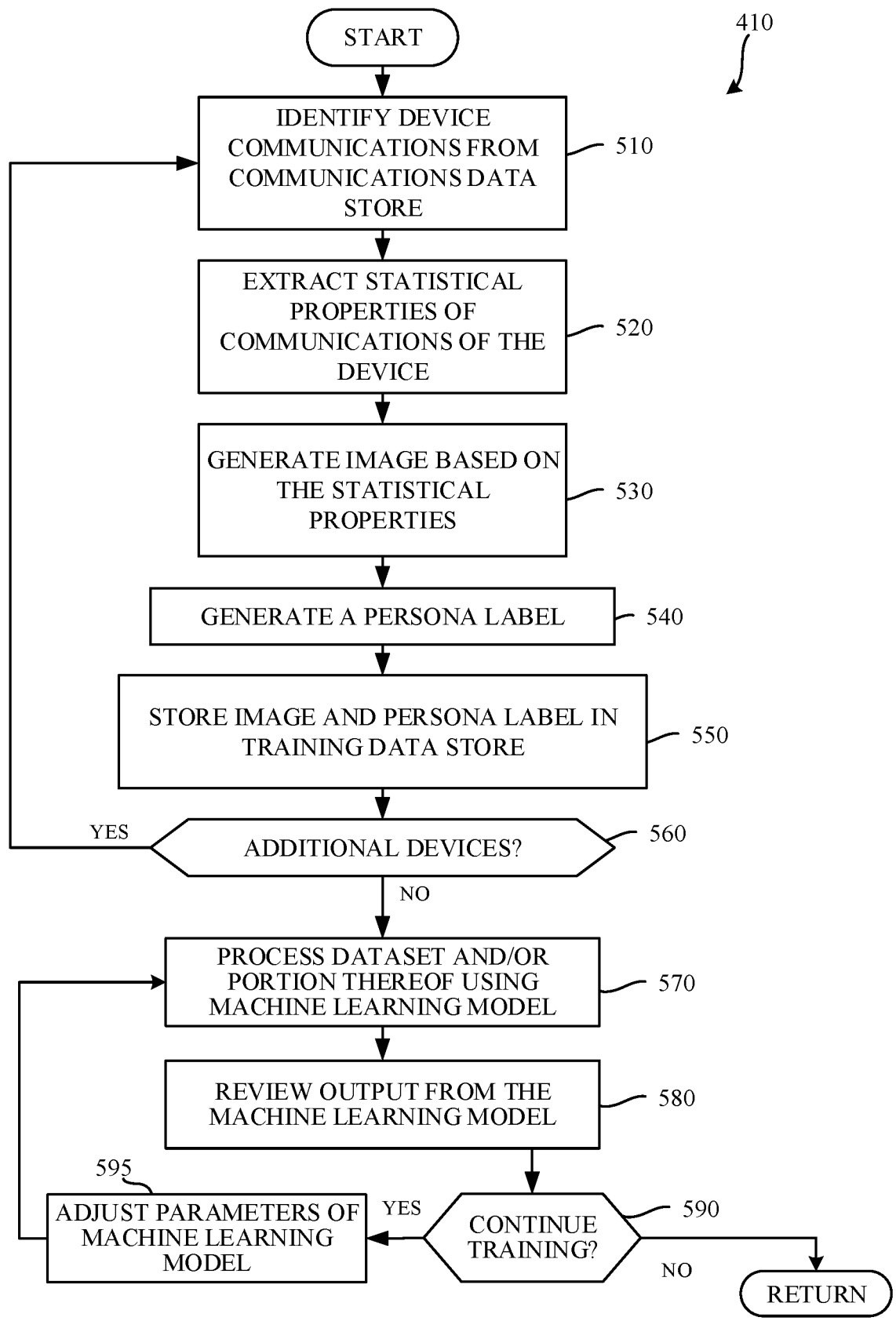
FIG. 5 is a flowchart representative of machine readable instructions which may be executed to implement the example anomaly detection circuitry of FIGS. 1 and/or 2 to train a machine learning model.

FIG. 5 is a flowchart representative of machine readable instructions 410 which may be executed to implement the example anomaly detection circuitry 140 of FIGS. 1 and/or 2 to train a machine learning model, as referenced in block 410 of FIG. 4. The example process 410 of FIG. 5 begins when the example machine learning model trainer 260 identifies communications of a device from the communications data store 220. (Block 510). In examples disclosed herein, communications are identified when they correspond to a same device. Communications are identified as corresponding to the same device based on a device identifier such as a hardware address, an Internet Protocol (IP) address, a device name, etc. Furthermore, communications are identified when those communications are associated with a recent amount of time (e.g., based on a timestamp of the communications). For example, communications are identified for training when those communications represent the past hour of communications. However, any other period of training data may additionally or alternatively be used. In examples disclosed herein, the amount of time used for training data is the same as the amount of time used for creating inference data (e.g., in connection with block 450 of FIG. 4).

The example statistical property extractor 230 extracts statistical information from the communications associated with the identified device. (Block 520). In examples disclosed herein, the statistical information includes, for example, an amount of communications aggregated from the device within a recent time period (e.g., within the last ten minutes, within the last hour, etc.), types of communications aggregated from the device, the presence of a particular parameter and/or content within the communications aggregated from the device (e.g., whether the device attempted to transmit a request to a particular domain name, etc.), etc. In examples disclosed herein, the statistical properties and/or instructions associated with extraction of those statistical properties may be provided to the anomaly detection circuitry from the centralized server 130 periodically and/or a-periodically.

Using the extracted statistics, the example image generator 240 creates an image. (Block 530). In examples disclosed herein, the same image generation process is used that is used in block 460 of FIG. 4. As noted above, the image represents a data structure capable of storing the extracted statistics or a transformation thereof. In some examples, the image is represented by a two-dimensional array with cell values (e.g., pixel values) corresponding to particular extracted statistics. For example, a first pixel in the image may correspond to an amount of data transmitted by the identified device, and a second pixel in the image may correspond to whether the device has communicated with a particular Internet domain.

The example persona identifier 250 generates a persona label to be used in association with the generated image. (Block 540). In examples disclosed herein, the persona label is represented by a sequence of alphanumeric characters. However, any other past, present, and/or future approach to labeling a persona may additionally or alternatively be used. In some examples, serially identified personas are used (e.g., a different persona is used for each iteration of the process of blocks 510 through 560).

The example persona identifier 250 stores the generated image and the persona label in the training data store 255. (Block 550). In some examples, new device personas and corresponding images are stored during each training iteration. However, in some examples, previously stored persona and image pairs may be removed from the training data store 255 to account for operations of the IoT devices changing over time.

The example statistical property extractor 230 determines whether there are any additional devices identified in the communications from the communications data store 220 (Block 560). If there is an additional device identifier (e.g., block 560 returns a result of YES), control proceeds to block 510, where blocks 510 through 560 are repeated until no additional device identifiers exist for processing.

Once all devices having data stored in the communications data store 220 have been processed (e.g., block 560 returns a result of NO), the example machine learning model trainer 260 causes the example machine learning model executor 270 to process the training data stored in the training data store (e.g., images as inputs and expected personas as corresponding outputs) and/or a portion thereof using a machine learning model stored in the machine learning model memory 280. (Block 570). The example machine learning model trainer 260 reviews the output of the machine learning model executor 270 to determine an amount of error of the machine learning model. (Block 580). For example, the machine learning model trainer 260 reviews the outputs of the machine learning model to determine whether the outputs from the model, when processing the images stored in the training data store, match the expected personas included in the dataset.

The example machine learning model trainer 260 determines whether to continue training. (Block 590). In examples disclosed herein, the example machine learning model trainer 260 determines whether to continue training based on whether the calculated amount of error meets or exceeds a threshold amount of error. For example, training may be performed until, for example, the calculated amount of error is below the threshold amount of error. To continue training (e.g., in response to block 590 returning a result of YES), the example machine learning model trainer 260 adjusts parameters of the machine learning model stored in the machine learning model memory 280. (Block 595). In some examples, the amount of adjustment to the parameters of the machine learning model is based on the calculated amount of error. Control then proceeds to block 570, where the process of blocks 570 through 590 is repeated until the calculated amount of error is less than the threshold amount of error (e.g., until block 590 returns a result of NO). The example process 410 of FIG. 5 then terminates, but may be later re-executed to perform subsequent training.

Figure 6:
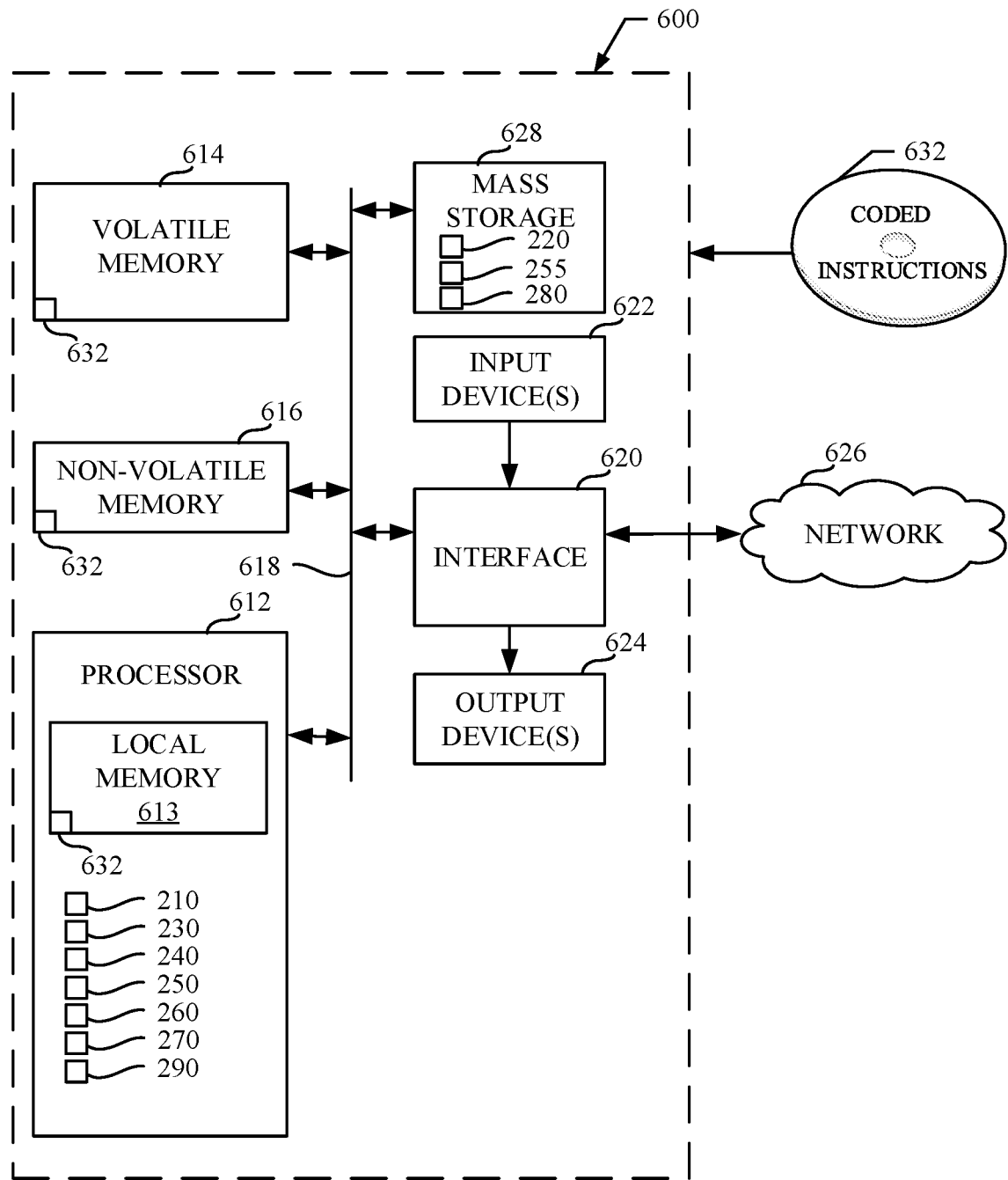
FIG. 6 is a block diagram of an example processing platform structured to execute the instructions of FIGS. 4 and/or 5 to implement the example anomaly detection circuitry of FIGS. 1 and/or 2.

FIG. 6 is a block diagram of an example processor platform 600 structured to execute the instructions of FIGS. 4 and/or 5 to implement the anomaly detection circuitry 140 of FIGS. 1 and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communications aggregator 210, the example statistical property extractor 230, the example image generator 240, the example persona identifier 250, the example machine learning model trainer 260, the example machine learning model executor 270, and the example anomaly detector 290.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 4 and/or 5 may be stored in the mass storage device 628, in the volatile memory 614, in the non-volatile memory 616, and/or on a removable non-transitory computer readable storage medium such as a CD or DVD. The example mass storage device 628 implements the example communications data store 220, the example training data store 255, and the example machine learning model memory 280.

From the foregoing, it will be appreciated that example methods, apparatus and articles of manufacture have been disclosed that enable a reduction in training time and/or effort associated with creation of a machine learning model used to identify a device persona. For example, example approaches disclosed herein do not require elongated time for baselining. As a result, the function of a device can be quickly and accurately associated with its network-based components very quickly. Example approaches disclosed herein also do not require accurate device fingerprinting or end point presence, as required in prior solutions.

Notably, example approaches disclosed herein enable a device's persona (particularly in the consumer space) to depend on a combination of factors including (1) the user using the device (which may include information concerning a time of the day the devices are used, how often the device is used etc.) and (2) other types of communication frequently used by the device (e.g., the kind of data used, the URLs/IPs accessed, etc.). Example approaches disclosed herein enable abstraction of those factors and combine them into one. The disclosed methods, apparatus and articles of manufacture improve the efficiency of using a computing device by enabling a machine learning model to be used to quickly identify anomalous communications and/or activities of a computing device. The disclosed methods, apparatus and articles of manufacture are accordingly directed to one or more improvement(s) in the functioning of a computer.

Methods, apparatus, systems, and articles of manufacture for detecting anomalous activity of an IoT device are disclosed herein. Further examples and combinations thereof include the following:

Example 1 includes an apparatus for detecting anomalous communications, the apparatus comprising a communications aggregator to aggregate communications from a device communicating via a communications interface, a statistical property extractor to extract statistical properties of the aggregated communications, an image generator to generate an image based on the extracted statistical properties, a persona identifier to identify a persona associated with the device, and a machine learning model trainer to train a machine learning model using the generated image and the persona.

Example 2 includes the apparatus of example 1, wherein the communications are first communications and represent communications occurring during a first time period, the statistical properties are first statistical properties, the image is a first image, the communications aggregator is to aggregate second communications from the device, the second communications representing communications occurring during a second time period after the first time period, the statistical property extractor is to extract second statistical properties of the aggregated communications, the image generator is to generate a second image based on the second statistical properties, and further including a machine learning model executor to execute the machine learning model to attempt to classify the second image as an output persona, and an anomaly detector to, in response to not identifying an output persona, perform a responsive action.

Example 3 includes the apparatus of example 2, wherein the anomaly detector is to not identify the output persona when at least one similarity score generated in connection with personas identifiable by the machine learning model do not meet or exceed a similarity threshold.

Example 4 includes the apparatus of example 2, wherein the anomaly detector is to instruct routing circuitry to block further communications from the device.

Example 5 includes the apparatus of example 1, wherein the aggregated communications represent communications collected via at least two communications interfaces.

Example 6 includes the apparatus of example 1, wherein the generated image is a first image, the persona is a first persona, and the machine learning model trainer is to train the machine learning model using a second image and a second persona.

Example 7 includes at least one non-transitory computer readable medium comprising instructions that, when executed, cause at least one processor to at least aggregate communications from a device communicating via a communications interface, extract statistical properties of the aggregated communications, generate an image based on the extracted statistical properties, identify a persona associated with the device, and train a machine learning model using the generated image and the persona.

Example 8 includes the at least one non-transitory computer readable medium of example 7, wherein the communications are first communications and represent communications occurring during a first time period, the statistical properties are first statistical properties, the image is a first image, and the instructions, when executed, cause the at least one processor to aggregate second communications from the device, the second communications representing communications occurring during a second time period after the first time period, extract second statistical properties of the aggregated communications, generate a second image based on the second statistical properties, execute the machine learning model to attempt to classify the second image as an output persona, and in response to not identifying an output persona, perform a responsive action.

Example 9 includes the at least one non-transitory computer readable medium of example 8, wherein the output persona is not identified when similarity scores generated in connection with personas identifiable by the machine learning model do not meet or exceed a similarity threshold.

Example 10 includes the at least one non-transitory computer readable medium of example 8, wherein the instructions, when executed, cause the at least one processor to instruct routing circuitry to block further communications from the device.

Example 11 includes the at least one non-transitory computer readable medium of example 7, wherein the aggregated communications represent communications collected via at least two communications interfaces.

Example 12 includes the at least one non-transitory computer readable medium of example 7, wherein the generated image is a first image, the persona is a first persona, and the instructions, when executed, cause the at least one processor to train the machine learning model using a second image and a second persona.

Example 13 includes a method for detecting anomalous communications, the method comprising aggregating communications from a device communicating via a communications interface, extracting, by executing an instruction with at least one processor, statistical properties of the aggregated communications, generating, by executing an instruction with the at least one processor, an image based on the extracted statistical properties, identifying, by executing an instruction with the at least one processor, a persona associated with the device, and training, by executing an instruction with the at least one processor, a machine learning model using the generated image and the persona.

Example 14 includes the method of example 13, wherein the communications are first communications and represent communications occurring during a first time period, the statistical properties are first statistical properties, the image is a first image, and further comprising aggregating second communications from the device, the second communications representing communications occurring during a second time period after the first time period, extracting second statistical properties of the aggregated communications, generating a second image based on the second statistical properties, executing the machine learning model to attempt to classify the second image as an output persona, and in response to not identifying an output persona, performing a responsive action.

Example 15 includes the method of example 14, wherein the output persona is not identified when similarity scores generated in connection with personas identifiable by the machine learning model do not meet or exceed a similarity threshold.

Example 16 includes the method of example 14, wherein the performance of the responsive action includes instructing routing circuitry to block further communications from the device.

Example 17 includes the method of example 13, wherein the aggregated communications represent communications collected via at least two communications interfaces.

Example 18 includes the method of example 13, wherein the generated image is a first image, the persona is a first persona, and the training of the machine learning model is further performed using a second image and a second persona.

Example 19 includes an apparatus for detecting anomalous communications, the apparatus comprising means for aggregating communications from a device communicating via a communications interface, means for extracting statistical properties of the aggregated communications, means for generating an image based on the extracted statistical properties, means for identifying a persona associated with the device, and means for training to train a machine learning model using the generated image and the persona.

Example 20 includes the apparatus of example 19, wherein the communications are first communications and represent communications occurring during a first time period, the statistical properties are first statistical properties, the image is a first image, the means for aggregating is to aggregate second communications from the device, the second communications representing communications occurring during a second time period after the first time period, the means for extracting is to extract second statistical properties of the aggregated communications, the means for generating is to generate a second image based on the second statistical properties, and further including means for executing the machine learning model to attempt to classify the second image as an output persona, and means for detecting to, in response to not identifying an output persona, perform a responsive action.

Example 21 includes the apparatus of example 20, wherein the means for detecting is to not identify the output persona when at least one similarity score generated in connection with personas identifiable by the machine learning model do not meet or exceed a similarity threshold.

Example 22 includes the apparatus of example 20, wherein the means for detecting is to instruct routing circuitry to block further communications from the device.

Example 23 includes the apparatus of example 19, wherein the aggregated communications represent communications collected via at least two communications interfaces.

Example 24 includes the apparatus of example 19, wherein the generated image is a first image, the persona is a first persona, and the means for training is to train the machine learning model using a second image and a second persona.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for detecting anomalous communications, the apparatus comprising:
   at least one memory;
   machine readable instructions; and
   processor circuitry to at least one of instantiate or execute the machine readable instructions to:
   aggregate communications from a device communicating via a communications interface;
   extract statistical properties of the aggregated communications;
   generate a first image based on the extracted statistical properties, the first image including a first pixel having a first value representing an amount of data transmitted by the device and a second pixel having a second value representing whether the device has communication with an Internet domain;
   identify a persona associated with the device;
   train a machine learning model using the generated first image and the persona;
   execute the machine learning model to attempt to classify a second image as an output persona; and
   perform a responsive action after not identifying the output persona.

2. The apparatus of claim 1, wherein the communications are first communications and represent communications occurring during a first time period, the statistical properties are first statistical properties, wherein the processor circuitry to at least one of instantiate or execute the machine readable instructions to:
   aggregate second communications from the device, the second communications representing communications occurring during a second time period after the first time period;
   extract second statistical properties of the aggregated communications; and
   generate the second image based on the second statistical properties.

3. The apparatus of claim 2, wherein the processor circuitry to at least one of instantiate or execute the machine readable instructions to:
   not identify the output persona when at least one similarity score generated in connection with personas identifiable by the machine learning model do not meet or exceed a similarity threshold.

4. The apparatus of claim 2, wherein the processor circuitry to at least one of instantiate or execute the machine readable instructions to:
   instruct routing circuitry to block further communications from the device.

5. The apparatus of claim 1, wherein the aggregated communications represent communications collected via at least two communications interfaces.

6. The apparatus of claim 1, wherein the generated image is a first image, the persona is a first persona, and the processor circuitry to at least one of instantiate or execute the machine readable instructions to:
   train the machine learning model using a second image and a second persona.

7. At least one non-transitory computer readable medium comprising instructions that, when executed, cause at least one processor to at least:
   aggregate communications from a device communicating via a communications interface;
   extract statistical properties of the aggregated communications;
   generate a first image based on the extracted statistical properties, the first image including a first pixel having a first value representing an amount of data transmitted by the device and a second pixel having a second value representing whether the device has communication with an Internet domain;
   identify a persona associated with the device;
   train a machine learning model using the generated first image and the persona;
   execute the machine learning model to attempt to classify a second image as an output persona; and
   perform a responsive action after not identifying the output persona.

8. The at least one non-transitory computer readable medium of claim 7, wherein the communications are first communications and represent communications occurring during a first time period, the statistical properties are first statistical properties, and the instructions, when executed, cause the at least one processor to:

aggregate second communications from the device, the second communications representing communications occurring during a second time period after the first time period;

extract second statistical properties of the aggregated communications; and generate the second image based on the second statistical properties.

9. The at least one non-transitory computer readable medium of claim 8, wherein the output persona is not identified when similarity scores generated in connection with personas identifiable by the machine learning model do not meet or exceed a similarity threshold.

10. The at least one non-transitory computer readable medium of claim 8, wherein the instructions, when executed, cause the at least one processor to instruct routing circuitry to block further communications from the device.

11. The at least one non-transitory computer readable medium of claim 7, wherein the aggregated communications represent communications collected via at least two communications interfaces.

12. The at least one non-transitory computer readable medium of claim 7, wherein the generated image is a first image, the persona is a first persona, and the instructions, when executed, cause the at least one processor to train the machine learning model using a second image and a second persona.

13. A method for detecting anomalous communications, the method comprising:

aggregating communications from a device communicating via a communications interface;

extracting, by executing an instruction with at least one processor, statistical properties of the aggregated communications;

generating, by executing an instruction with the at least one processor, a first image based on the extracted statistical properties, the first image including a first pixel having a first value representing an amount of data transmitted by the device and a second pixel having a second value representing whether the device has communication with an Internet domain;

identifying, by executing an instruction with the at least one processor, a persona associated with the device;

training, by executing an instruction with the at least one processor, a machine learning model using the generated first image and the person;

executing, by executing an instruction with the at least one processor, the machine learning model to attempt to classify a second image as an output persona; and performing, by executing an instruction with the at least one processor, a responsive action after not identifying the output persona.

14. The method of claim 13, wherein the communications are first communications and represent communications occurring during a first time period, the statistical properties are first statistical properties, and further comprising:

aggregating second communications from the device, the second communications representing communications occurring during a second time period after the first time period;

extracting second statistical properties of the aggregated communications; and generating the second image based on the second statistical properties.

15. The method of claim 14, wherein the output persona is not identified when similarity scores generated in connection with personas identifiable by the machine learning model do not meet or exceed a similarity threshold.

16. The method of claim 14, wherein the performance of the responsive action includes instructing routing circuitry to block further communications from the device.

17. The method of claim 13, wherein the aggregated communications represent communications collected via at least two communications interfaces.

18. The method of claim 13, wherein the persona is a first persona, the output persona is a second persona, and the training of the machine learning model is further performed using a third image and a third persona.

19. An apparatus for detecting anomalous communications, the apparatus comprising:

means for aggregating communications from a device communicating via a communications interface;

means for extracting statistical properties of the aggregated communications;

means for generating a first image based on the extracted statistical properties, the first image including a first pixel having a first value representing an amount of data transmitted by the device and a second pixel having a second value representing whether the device has communication with an Internet domain;

means for identifying a persona associated with the device;

means for training to train a machine learning model using the generated first image and the persona;

means for executing the machine learning model to attempt to classify a second image as an output persona; and means for performing a responsive action after not identifying the output persona.

20. The apparatus of claim 19, wherein the communications are first communications and represent communications occurring during a first time period, the statistical properties are first statistical properties, the means for aggregating is to aggregate second communications from the device, the second communications representing communications occurring during a second time period after the first time period, the means for extracting is to extract second statistical properties of the aggregated communications, the means for generating is to generate the second image based on the second statistical properties.

* * * * *

UNITED STATES PATENT AND TRADEMARK OFFICE
CERTIFICATE OF CORRECTION

| | |
|---|---|
| PATENT NO. | : 11,616,795 B2 |
| APPLICATION NO. | : 16/549806 |
| DATED | : March 28, 2023 |
| INVENTOR(S) | : Sanzgiri et al. |

It is certified that error appears in the above-identified patent and that said Letters Patent is hereby corrected as shown below:

In the Claims

In Column 23, under Claim 13, in Line 49, delete "person;" and insert --persona;--.

Signed and Sealed this
Sixteenth Day of May, 2023

Katherine Kelly Vidal
Director of the United States Patent and Trademark Office